(12) United States Patent
LeCompte et al.

(10) Patent No.: US 7,457,027 B2
(45) Date of Patent: Nov. 25, 2008

(54) FABRICATION OF CELL CAVITIES FOR ELECTROOPTIC DEVICES

(75) Inventors: Robert S. LeCompte, Tucson, AZ (US); Juan Carlos Lopez Tonazzi, Tuscson, AZ (US)

(73) Assignee: ElectroChromix, Inc., Tucson, AZ (US)

( * ) Notice: Subject to any disclaimer, the term of this patent is extended or adjusted under 35 U.S.C. 154(b) by 257 days.

(21) Appl. No.: 11/185,261

(22) Filed: Jul. 20, 2005

(65) Prior Publication Data

US 2006/0027260 A1    Feb. 9, 2006

Related U.S. Application Data

(60) Provisional application No. 60/589,492, filed on Jul. 20, 2004.

(51) Int. Cl.
*G02F 1/15*    (2006.01)

(52) U.S. Cl. .................. 359/265; 359/272; 345/49; 345/105; 264/4

(58) Field of Classification Search .............. 359/265, 359/272; 345/49, 105; 349/154; 264/4
See application file for complete search history.

(56) References Cited

U.S. PATENT DOCUMENTS

| | | | |
|---|---|---|---|
| 5,140,455 A | 8/1992 | Varaprasad et al. | |
| 5,724,187 A | 3/1998 | Varaprasad et al. | |
| 5,856,211 A | 1/1999 | Tonazzi et al. | |
| 5,910,854 A | 6/1999 | Varaprasad et al. | |
| 6,111,684 A | 8/2000 | Forgette et al. | |
| 6,195,193 B1 | 2/2001 | Anderson et al. | |
| 6,245,262 B1 | 6/2001 | Varaprasad et al. | |
| 6,606,183 B2 | 8/2003 | Ikai et al. | |
| 7,255,451 B2 * | 8/2007 | McCabe et al. | 359/605 |
| 2002/0021482 A1 | 2/2002 | Fitzmaurice et al. | |
| 2004/0233537 A1 | 11/2004 | Agrawal et al. | |

OTHER PUBLICATIONS

Lynam N.R. et al., Automotive Applications of Chromogenic Materials, Lampert C.M., et al., editor, "Large Area Chromogenics: Materials and Devices for Transmittance Control", SPIE Optical Eng. Press, Bellingham, WA (1990).

M. Graatzel, Platinum Metals Rev., 38, 151-159 (1994) Highly efficient nanocrystalline photovoltaic devices: CT sensitizers based on Ru and Os achieve outstanding performance.

* cited by examiner

*Primary Examiner*—Joseph Martinez
(74) *Attorney, Agent, or Firm*—Lawrence R. Oremland, P.C.

(57) ABSTRACT

This invention discloses methods to dispense adhesives for fabricating electrooptic devices. In addition the invention also discloses on how the cavities of these electrooptic devices may be filled using detachable tabs. The Electrooptic devices of this invention may comprise liquid or solid electrolytes.

16 Claims, 2 Drawing Sheets

FABRICATION OF CELL CAVITIES FOR ELECTROOPTIC DEVICES

RELATED APPLICATIONS/CLAIM OF PRIORITY

This application is related to and claims benefit of and priority to U.S. provisional applications 60/589,492 filed on Jul. 20, 2004.

BACKGROUND OF THE INVENTION

Electrooptic devices are used for many applications, such as electrochromic (EC) devices, including displays, rear-view mirrors for transportation and windows; liquid crystal devices, solar cells and light emitting devices. Many of these devices require two substrates to be bonded in a spaced apart geometry, so that the space between the substrates may be filled with a medium. Examples of the mediums are electrolytes and liquid crystal compositions.

This disclosure provides novel ways of fabricating devices with cavities formed using two substrates which are sealed at the perimeter; applying perimeter sealants and filling the cavities with appropriate mediums.

BRIEF SUMMARY OF THE INVENTION

This invention discloses methods to fabricate electrooptic devices comprising of a cavity formed by two substrates assembled in a spaced apart relationship by using an adhesive (or sealant) bond close to their perimeter. The disclosure provides methods to dispense the adhesive so that uniform bond widths may be obtained. In addition the invention also discloses on how the cavities of these electrooptic devices may be filled using detachable tabs.

DETAILED DESCRIPTION OF THE INVENTION

Figure 1A:
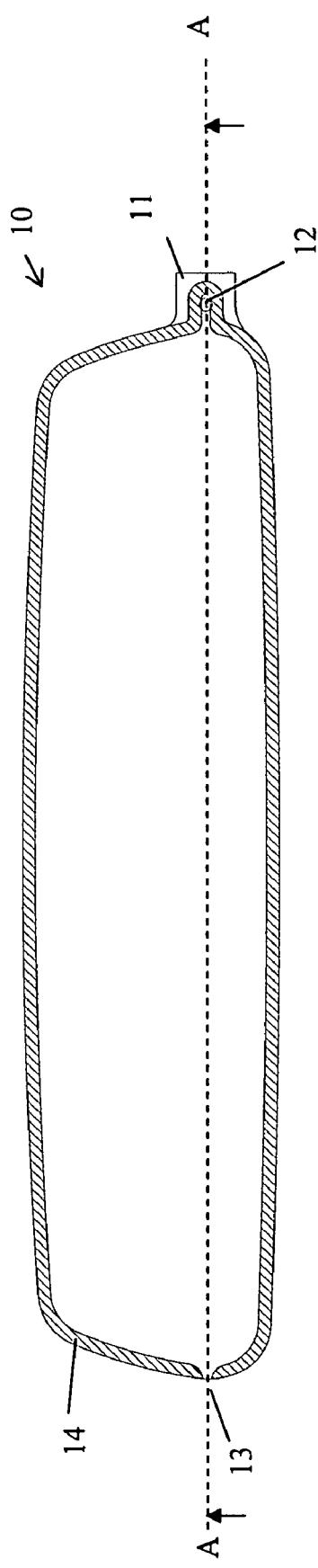
FIG. 1a is a schematic view of a portion of an EC mirror being formed by a process according to the present invention, showing an EC mirror with a tab comprising a port for filling.

Liquid crystal mirrors, displays (Kmetz, A. R., et al., Non-Emissive Electrooptic Displays, Plenum Press, NY (1976)) and electrochromic mirrors (Lynam N. R. et al, *Automotive Applications of Chromogenic Materials*, Lampert C. M., et al editor, "Large Area Chromogenics: Materials and Devices for Transmittance Control", SPIE Optical Eng Press, Bellingham, Wash. (1990)) have been made commercially for many years, in addition electrochromic displays (US published patent application 2002/0021482) and dye sensitized solar cells (M. Grätzel, Platinum Metals Rev., 38, 151-159 (1994) *Highly efficient nanocrystalline photovoltaic devices: CT sensitizers based on Ru and Os achieve outstanding performance*) have also been demonstrated which utilize two substrates with conductive and optionally with other coatings on the walls which face each other inside the cavity. The substrates may be planar or non-planar. In most of these devices, the cavity is pre-fabricated by dispensing a sealant (called main sealant) on the surface of one of the substrates near the perimeter, and then lowering the second substrate so that the adhesive is sandwiched between the two forming a cavity between the two substrates. The cavity thickness (or spacing between the two substrates) is usually determined by adding spacers to the adhesive or sprinkling the spacers on the surface of one of the substrates before assembling them. The second substrate is lowered and the two substrates are held together by springs, clips or a pressure while the sealant is cured. Any pressure may be used as long as the spacer beads do not get crushed prior to the curing of the sealant. Pressure may also be applied by enclosing the assembled plates in a vacuum bag and then evacuating the bag prior to curing. To ensure that the plates do not move relative to each other in operations prior to the seal cure, one may also use localized application (a few spots) of quick curing adhesives, e.g., UV curable types, thermoplastic glues which may further cure by reaction with moisture. Curing of the main seal is done by heating and/or by subjecting the assembly to radiation, e.g., UV, infrared and microwave. Generally a small gap is left in the sealant which is then used to backfill the liquid medium and then it is plugged with another sealant (called plug sealant) which is generally cured by UV. Details on sealants, devices and processing may be found in many references. Some of the exemplary references on electrochromic devices are U.S. Pat. Nos. 6,606,183; 6,111,684; 6,195,193; 5,724,187 and published US patent application 2004/0233537. The descriptions of devices, sealants and processing of devices described in these references are incorporated herein by reference.

The sealants for these devices are generally based on epoxy resins due to their inertness, good adhesion and temperature performance. For example in many EC devices for automotive rear-view mirrors there are requirements to subject these to 85° C./85% RH for extended periods of time or to steam autoclave testing at 121° C. Important tests for automotive EC mirrors are summarized in U.S. Pat. No. 6,245,262. However, sealants based on acrylics, urethanes, butyls and silicones may also be used as long as they do not compromise any of the performance parameters of the device. Hybrid materials such as acrylic silicones, urethane-acrylics, urethane-silicones, acrylic-epoxies, etc. may also be used. In the hybrid materials typically one of the moieties is pre-formed and the other one is responsible for reacting and curing. For example, in an epoxy acrylic, the curing mechanism of the adhesive is by reaction related to acrylate groups, whereas the base material (resin) for the adhesive is formed by reacting epoxy groups. Adhesives based on interpenetrating networks may also be used where two different mechanisms of polymerization (and/or crosslinking) may be used resulting in interlocked polymers. One may also have systems where both epoxy and the acrylics react during cure, e.g., acrylic may be UV activated to result in partial cure and quick green strength for handling, etc, and epoxy groups react later when subjected to heat to result in the final properties. Particularly, the barrier of the non-epoxy sealants may be considerably improved by adding nano-particles (see published US patent application 2004/0233537) which may be added along with conventional inorganic fillers. The filler content in the adhesives is usually kept lower than about 65% by weight and of the nano-particles lower than 30%. Those main sealants are preferred so where no volatiles are given out as they cure. As an example RTV silicones which cure due to hydrolysis and condensation giving off acetic acid or alcohol are less preferred over those two component silicones where platinum chemistry is used for addition crosslinking. The reaction mechanism of such systems are known widely (e.g., Handbook of Adhesives and Sealants, Petrie, E. M., McGraw Hill, (2000)). Preferred sealants are cured by UV, microwaves or heat, preferably at temperatures lower than 250° C. Proper primers or adhesion imparting agents (e.g., silanes of amine, epoxy, vinyl, mercaptan, isocyanate, or titanates and zirconates) may be directly mixed with the adhesive formulation or the substrates primed before adhesive dispensing. Many of these adhesion promoters are available from Dow Corning (Midland, Mich.), GE Silicones (Wilton, Conn.) and Kenrich Petrochemicals Inc (Bayonne, N.J.)

Preferred method of dispensing the adhesive under force for main seal is by positive displacement. For example, U.S. Pat. No. 6,606,183 describes a dispensing method where pneumatic pressure is used to dispense the adhesive from a reservoir on to the substrate. This method causes problems with adhesive dispensing consistency. The viscosity of the adhesive may change with time, temperature of the environment or when different batches are used. The adhesive, specially comprising fillers and spacer beads may plug the dispensing orifice momentarily causing the flow to change. In addition, one needs to control the uniformity of the bead size as the dispensing head changes as it turns around the corners and arcs. This may be done in one of two ways. One way is to ensure that the linear velocity between the substrate and the dispensing head is constant regardless of twists and turns in the dispensing trajectory, or the second alternative is to change dispense rate to compensate for a different velocity at the arcs and turns. The latter is more doable when using direct or positive control over the dispense rate. Pressure control may introduce a large lag before the dispense rate changes, making control of seal width uniformity cumbersome. A preferred method is to keep the substrate stationary, while the dispensing head is moved at a fixed linear speed thus compensating for the turns and arcs and dispensing at a constant rate. Some of the platforms such as Axiom® and Century® for dispensing are available from Asymtek (Carlsbad, Calif.)

Positive displacement methods using screw, augers, jet dispensers, etc. are preferred so that the dispensing volume is controlled accurately and dynamically to insure uniform bead size. The dispensing speed may be any as long as it gives the desired throughput without pulling off (or stringing) the adhesive from the substrate. This is dependent on the surface tension characteristics of the adhesive relative to the substrate on which it is being dispensed, the relative velocity between the substrate and the dispensing head, the dispense rate (g/s or ml/s), the size of the gap between the tip and the substrate, and the properties of the adhesive such as its viscosity and viscoelastic characteristics. In auger type positive displacement, one has to be careful that the spacer beads do not get crushed from the screw or auger action of the dispenser as the clearance between the interior barrel wall of the dispenser and the screw may be close. Typically it is preferred that for positive displacement systems the spacer size (e.g. beads made of glass and crystalline materials) be limited to 300 microns or preferably smaller than 150 microns. One may also feed the adhesive into an auger system using pressure, and then the auger further conveys the material on to the substrate at a controlled flow rate.

Another alternative for positive displacement is to move the piston of a reservoir of adhesive by a screw mechanism at a constant or a controlled rate. One may apply a pressure (preferably hydraulic) over the piston so that the pressure is tied to a constant displacement mechanism, i.e., vary the pressure as required to keep the displacement of piston constant or controlled. Some of the dispensing systems accommodating these principles are available from Asymtek (Carlsbad, Calif.), Fishman Corp (Hopkinton, Mass.) and AcuSpense (Salt Lake City, Utah). Examples of valves from Asymtek are DJ9000, DJ2200, DP3000, DV7000 and DV8000. Particularly preferred method is by using jet dispensing in production environment. In this method a series of dots are dispensed in quick succession and depending on the relative rate of the dispensing of dots and substrate to the nozzle, continuous lines of sealants can result. This method also avoids the stringing of the adhesive which can be a problem with continuous dispensing and further the "z" control or the control over the distance between the substrate and the nozzle tip is less important thus giving better control over the process. This is particularly useful when dispensing over curved substrates such as fabricating non-planar outside rearview mirrors. For example DJ9000 has flow rate up to 120 mg/second and high shot rate up to 200 dots per second.

The main sealant may be dispensed without spacer beads. Prior to the assembly of the second substrate, beads may be sprinkled on the dispensed adhesive bead and/or on the substrate.

The process conditions of adhesive dispensing depend on the thickness of the seal in the device (e.g., spacer size), width of the seal, viscosity of the adhesive (temperature dependent) and the rate of relative movement between the substrate and the dispenser. Usually, the dispensing tip (or dispensing needle) is heated by 10 to 80° C. above room temperature (nominally 25° C.) to reduce viscosity only at the point of dispensing to increase flow consistency. The adhesive being dispensed does not reside at elevated temperatures for long periods of time due to the small volume of the needles used. Short residence time limits the curing of the adhesive at these elevated temperatures. The dispensed bead size is typically different from the adhesive dimensions in a finished device. After dispensing when the second substrate is lowered, the bead is squeezed and it is flattened out which increases its width. The sealant is cured in a state where pressure is applied to the substrates. This pressure should not crush the spacers. Typically a pressure of less than 0.014 Mpa (2 psi) on the substrates is enough. This increase in width is typically large for thinner seal thickness (e.g., less than 100 microns). For example, for most EC automotive mirrors, the seal thickness is less than 200 microns and the seal width is between 1 to 4 mm. For large mirrors e.g. 15×25 cm or larger mirrors for trucks, one may use up to 1 cm wide seals. The sealants are paste-like thixotropes so that after assembly and during cure they do not run (typical viscosity range is between 500 to 2,500 poise). In this application the relative movement between the substrate and the dispensing nozzle is usually between 1 to 20 cm/s. The dispense rate is 0.002 to 0.1 ml/s. The diameter of the nozzle dispensing the adhesive is smaller than the final seal width and is generally in the range of 0.25 to 3 mm (for seal widths of 1 to 4 mm). As an example dispensing needles with gages between 14 and 22 are most common. The location of the tip from the substrate is dependent on the diameter of the bead being dispensed, and it should be about 0.1 to 2 times the diameter of the nozzle. It is preferred that this distance be accurately controlled, some of the typical methods are mechanical follower or optical gages to compensate for flatness and curvature in the substrate (e.g., for non-planar mirrors). As discussed earlier a pressure is applied on to the two substrates to keep the sealant under a slight pressure as it cures. This pressure typically ranges from 0.034 to 1.4 MPa (5 to 200 psi) as calculated on the seal area.

Backfilling using liquids is well known in the art. This has been used for almost three decades in the liquid crystal industry, and for more than 15 years in the EC mirror industry. Its principles for EC devices are described in U.S. Pat. No. 5,140,455. Another way of filling devices is by injection of electrolyte. Several methods are known to fill the cavities in this fashion, e.g., U.S. Pat. No. 5,856,211 describes a method to fill large area cavities. Here additional cavities are created outside of the cavity to be filled so that simultaneous evacuation of all of these will not collapse the cavity which has to be filled. For rear-view mirror sized devices used for passenger cars this method may not be necessary.

Electrolytes with polymeric additives may have higher viscosities, e.g., greater than 1P. In these cases injection of the electrolyte in the cavities is preferred. A preferred way of filling by injection is to have at least two openings to the cavity which preferably should be spaced from each other as far as possible. Before filling one may optionally introduce an inert gas through one of these openings to eliminate air. The fluid is then introduced through one of these openings and the cavity is filled as the inside gas is displaced through the second opening. At the end of the process both the openings are plugged using a sealant. Preferred sealants are UV curable acrylics (including methacrylates), particularly belonging to the subclass of UV curable acrylic-esters, epoxy-acrylates and urethane-acrylates. One may optionally prime the plug area prior to the application of the UV curable sealant. One may also use vacuum at the second opening to assist with the filling process.

Figure 1B:
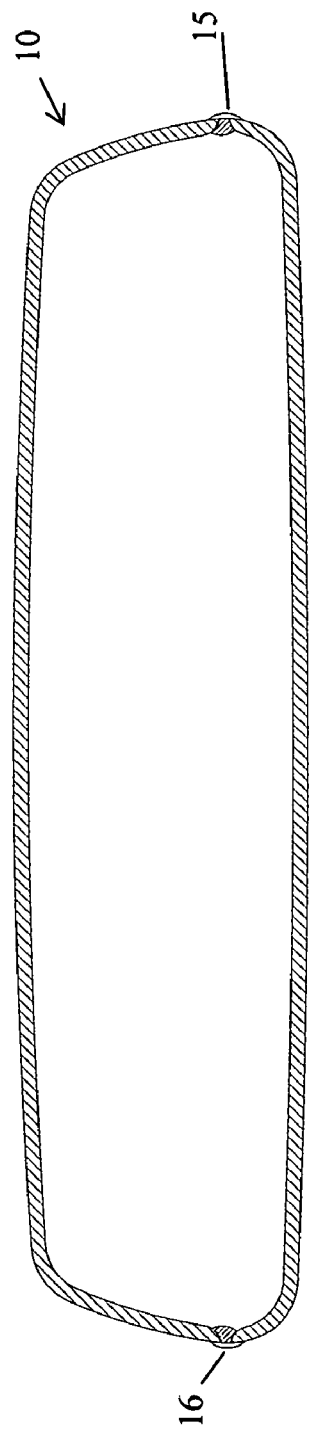
FIG. 1b shows another schematic view of an EC mirror at another stage in the process, in which the tab is removed after filling with the electrolyte and the plug areas are sealed.
Figure 2:
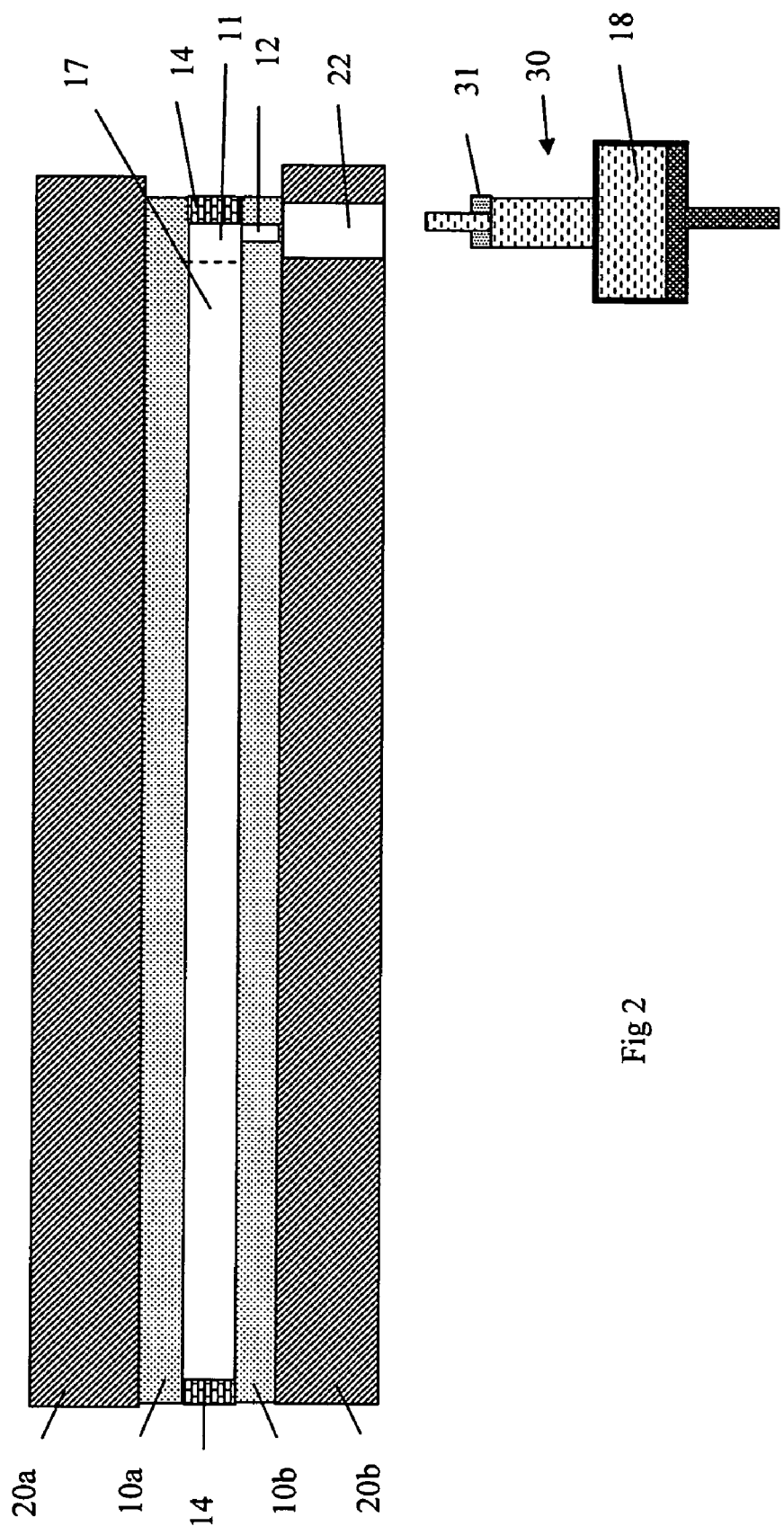
FIG. 2 shows a schematic view of the cavity filling process, taken from the direction A-A in FIG. 1a, and also showing an injector that can be used in the cavity filling process.

A preferred embodiment of an automobile rearview mirror that can be formed using the process of the present invention is shown in FIGS. 1a, 1b and 2. The cavity 17 for a rearview mirror 10 is formed between two substrates 10a, 10b which are assembled using a perimeter adhesive (or sealant) 14. The substrates are usually offset from one another along the long axis to attach busbars (this is not shown). Other busbar configurations may also be used as described in published US patent application 2004/0233537 where one of the electrodes uses more than 50% of the perimeter for attaching busbars As the mirror is being formed, one of the mirror components has a detachable tab 11, and one of the two substrates (e.g. substrate 10b) has a drilled hole (opening) (12) located in the tab area. This hole acts as a filling port for the fluid electrolyte. During the process of applying the sealant 14, the sealant material is applied to at least one substrate in a pattern such that a small vent opening (13) is left in the seal at a location that is spaced from the tab 11. This opening in the main seal (13) acts as a vent for any gas or excess electrolyte during the electrolyte filling process. The sealant 14 is also applied to the at least one substrate so as to extend about the drilled hole 12, so that the sealant effectively defines an inlet opening that allows electrolyte to directed through the hole 12 and into the cavity 17. The diameter of the drilled hole for fabricating rearview mirrors is preferably in the range of 1-4 mm, and this is about the same width for the inlet opening in the sealant 4. The cavity 17 is filled with the electrolyte by inserting a filling nozzle 30 into an opening 22 in a hot platen 20b located against the substrate 10b, and temporarily sealing the filling nozzle 30 around the drilled hole (12). Due to geometrical constraints it is much easier to seal a nozzle on the surface around this hole (as compared to the opening in the sealant 14) and fill the cavity by injecting the electrolyte under force without causing leakage. Filling pressure is dependent on the electrolyte viscosity and the desired rate of filling. Typical filling pressures are in the range of 0.034 to 0.34 Mpa (5 to 50 psi). Filling pressures are dependent on the electrolyte viscosity, fill rate and the cavity dimensions. Filling may also be done where the fill rate is controlled rather than the fill pressure. Fill rates are generally in the range of 0.05 to 2 ml/minute for each cavity. For a continuous manufacturing process one may employ several fill heads that are located on a conveyor or a carousel type arrangement.

One may also use a mirror cavity where no tab is formed on the substrate, only two holes are left in the main sealant opposite one another as shown in FIG. 1b. The filling machine is equipped with a tab that seats firmly against one of these holes for filling operation only.

After filling of the cavity 17 is complete, the tab 11 is removed, which leaves a gap in the sealant about the hole 12. That gap, and the vent opening 13 in the sealant, are sealed as shown in FIG. 1b by 15 and 16 (which can be mechanical seals, or additional sealant that is held in place by mechanical caps). Completion of the filling process may be detected after the electrolyte passes through the vent hole 13, or with a sensor located close to the vent or filling in a prescribed amount of electrolyte. One may first seal the vent opening 13 (by means of seal 16), and then remove the tab 11 followed by sealing of the gap in the sealant about the hole 12 (by means of seal 15), but there is no required order in which the vent opening 13 and the gap formed in the sealant about the hole 12 should be sealed.

There are several variations to the cavity filing technique of the present invention. The cavity and the electrolyte may be heated during the filling process so as to reduce the viscosity or to fill the electrolyte in the molten state. One may prescribe the substrate so that the tab is easily removed by breaking along the scribed line. Another option in the cavity design may be use of two tabs. For example, the vent 13 in the seal (FIG. 1a) is replaced by another tab with a hole as shown by 11 and 12.

A side view of the mirror cavity and a preferred filling technique is shown in FIG. 2. The cavity composed of the two substrates 10a and 10b which is sealed using the perimeter seal 14 is placed between hot platens 20a and 20b. The section of the cavity shown is taken from section A-A in FIG. 1. The cavity (17) is formed by the substrates 10a and 10b formed by the perimeter sealant 14. The hole (12) in the cavity tab (11), is aligned with a hole in the platen 22. A plunger 30 with the electrolyte 18 is inserted through the holes 22 and 12 to fill the cavity (17). An "O" ring 31 is placed to ensure that the electrolyte during filling does not leak. The platens 20a, 20b are typically clamped to keep the cavity plates flat during filling and to avoid excessive burst pressure on the perimeter seal 14. The force on the platen should be such so that it compensates for any fill pressure that may result in bulging of the cavity plates. After filling, one may remove the fill pressure and still leave the platen on for a few seconds to minutes to ensure that any excess fluid oozes out. There may be a sensor which is placed near the vent 13 from the fill port to see when the cavity is full, or alternatively a pre-measured quantity of the electrolyte is filled before stopping the filling process.

One may fill devices with electrolytes which solidify forming multiphase structures as described in published US patent application US2004/0233537. The electrolyte and the cavity temperature are typically above the melting point of the electrolyte, preferably 25 to 75° C. above the melting point. After the filling operation the device is cooled to solidify the electrolyte by formation of more than one phase. The tab is removed and both of the openings are plugged. Alternatively, the electrolytes comprising monomers and reaction promoters may be filled into the cavity which are then later polymerized and/or cross-linked to yield a solid electrolyte (e.g., see U.S. Pat. No. 5,910,854). Since in these methods injection is used, higher viscosity fluids may be filled. This gives the ability to use higher molecular weight monomers, e.g. those exceeding a molecular weight of 1000, or preferably 5000 so as to reduce shrinkage during further polymerization inside the cavity.

EXAMPLE 1

Epoxy Formulation and Dispensing

Electrochromic interior mirror cells were prepared using this epoxy as the perimeter seal. Substrates were two glass plates coated with indium-tin oxide (ITO) transparent conductor on one of the surfaces of each of these plates (size about 25 cm×6 cm, mirror shaped). The conductivity of ITO was between 12 and 15 ohms/square. Prior to the adhesive dispensing, the ITO face near the perimeter (about 2.5 mm from the edge) of both of the substrates was primed. A primer used for this purpose was prepared by 5 vol. % water+2 vol. % aminoethylaminopropyltrimethoxysilane (Z6020 from Dow Corning MI) in ethyl alcohol. This primer was then allowed to dry under ambient conditions. Epoxy adhesive was dispensed on the perimeter of one of the substrates. An epoxy perimeter seal formulation of an electrooptic cell was prepared from the following reagents:

TABLE 6

| Material | Quantity Used |
| --- | --- |
| Shell EPON Resin SU-3.0 | 10.0 g |
| THPE/GE | 2.04 g |
| HHMPA | 9.207 g |
| MY-H | 0.5 g |
| Fumed Silica | 1.0 g |
| Carbon Black | 0.12 g |
| Silicate filler | 25 g |
| Titania powder | 2.4 g |
| Glass spacers | 0.1 g |

The epoxy was prepared by mixing at 50° C. the EPON resin (Resolution Performance Products, Houston, Tex.) and THPE/GE (Dupont Electronic Technologies, Dayton, Ohio) until a homogeneous mixture was formed. The anhydride HHMPA (Hexahydro-4-methylphthalic anhydride) was added and thoroughly mixed. The mixture was allowed to reach room temperature before the catalyst MY-H was added and thoroughly mixed. The fumed silica (product 38-126-8 from Aldrich Chemical Co, Milwaukee, Wis.) carbon black (Mogul L from Cabot Corp (Billerica, Mass.), epoxy silanized silicate (Novacite™ L207A from Malvern Industries (Hot Springs, Ark.)) titania (R960 from Dupont Chemicals, Wilmington, Del.) were then added under vigorous stirring. Once a homogeneous mixture was formed, spherical glass spacer beads (88 microns in diameter from Potter industries, Canby, Oreg.) were then added under stirring. The epoxy was degassed in vacuum and filled in the syringe. It is degassed again in the syringe by centrifuging.

A dispensing tip of 1 mm diameter (internal) was attached to the syringe. One of the ITO coated glass plates was used to dispense the adhesive close to its perimeter. The piston (plunger) of the syringe was pushed by a lever attached to a screw mechanism. The dispense rate was 0.038 ml/s, and the dispensing head was moved at a linear rate of 17 cm/s. the dispensing head accelerated or decelerated around the corners and arcs to maintain this linear rate. The second plate was lowered on to the sealant with a slight offset so as to attach electrical leads to be able to power these devices. The plates were retained in position by applying clips around the perimeter. The average pressure holding the two plates was 0.06 Mpa (8 psi) (calculated on seal area). During dispensing a hole about 2 mm wide was left in the seal to introduce the electrolyte later by backfilling. The sealant was cured at 150° C. for one hour and cooled over 1-2 hours to about 70° C. (which is lower than the glass transition temperature (Tg) of the seal) before removing them from the oven and then removing the clips. The cured sealant width was about 2.5 mm. The cavities were filled with an electrolyte by back filling under argon through a fill hole left in the perimeter of the epoxy seal. After filling, the fill hole was cleaned using a wipe and a primer applied by another wipe lightly damped with the primer. The primer was air dried for about 15 seconds. The fill hole was then sealed with a commercially available UV curing acrylate. The primer was made by taking methanol (20.1 g) deionized water (1.32 g), acetic acid (0.55 g) and Silquest A174 silane (0.026 g, a methacrylic silane) and mixing these in the same order and leaving it overnight at room temperature prior to use. The silane is available from GE silicones (Danbury, Conn.). The durability of the sealing process was tested in an autoclave under conditions as described earlier. The autoclave was vented every day and the cells examined. After 9 days in the autoclave the cells were completely intact with no seal failure and colored upon powering. The autoclave test was terminated after this period.

EXAMPLE 2

Fabrication of an EC Mirror with Solid Electrolyte

An automotive rear-view EC mirror was fabricated with a third surface reflector and a solid electrolyte. The reflective surface served both as a reflector and as one of the electrodes. This electrode comprised of a glass coated silver layer (~150 nm) followed by about 100 nm of transparent but conductive indium tin oxide (ITO) layer with the surface resistance of the composite layer of 0.4 ohms/square. The counterelectrode was an ITO coated glass substrate where the resistivity of the ITO was close to 50 ohms/square. In the assembled device the conductive layers faced inwards. The transparent substrate was powered by two busbars located at the top and bottom long edges, and the reflective substrate was powered by attaching the busbar to about 1.5 cm long area on the side edges. More details on busbar configuration are described in published US patent application 2004/0233537.

An epoxy formulation for the main seal was made as described in the above example. To this epoxy a pre-hydrolyzed silane was added as described below so that the priming step was eliminated. The pre-hydrolysed silane was made as following: an epoxy silane glycidoxypropyltriethoxysilane (Z6040 from Dow Corning) was mixed with 0.1143 g of acidified water (pH 2, by adding hydrochloric acid). This was heated at 60° C. for 3 hours under continuous stirring for hydrolysis of the silane. For each 100 g of the above epoxy formulation, 1.2 g of the hydrolyzed silane was added. Spacers in a size of 63 microns were added to this adhesive.

The substrates had a geometry following the principles of FIG. 1a with a tab. The epoxy was dispensed on the reflective surface and the tab with clear substrate (ITO coating only) had a hole in a size of (3 mm in diameter). The opening in the main seal adhesive was about 4 mm wide. The ambient temperature was 25C and the reservoir for the adhesive along with the dispensing tip were heated to 33C. The dispensing tip diameter (internal) was 1 mm. The dispense rate was 0.038 ml/s, and the dispensing head was moved at a linear rate of 24 cm/s. the dispensing head accelerated or decelerated around the corners and arcs to maintain this rate. Another substrate with conductive coating (50 ohms/square) facing inwards of the cavity was lowered on to this substrate taking care of the offsets required for busbar attachment. The two substrates were clamped with several clips around its perimeter resulting in a pressure of about 0.06 Mpa (8 psi) in the seal area.

While clamped, the substrates were cured at 150° C. for 1 hour. The oven was cooled to 70° C. before removing the cured assembly.

The electrolyte was prepared by dissolving 2.18925 g of 1-butyl-3-methylpyrrolidinium bis(trifluoromethanesulfonyl)imide (BMP), 0.8025 g of propylene carbonate, and a polymer 0.15704 g (Solef 21216/1001 from Solvay Solexis, Thorofare, N.J.) at 150° C. The mixture was cooled to 25° C. and a bridged dye with ferrocene and viologen with bis(trifluoromethanesulfonyl)imide anion was added (0.14228 g). The mixture was reheated to 90° C. and mixed till a homogeneous mixture was obtained. This preparation was done under inert conditions.

The cavity was heated to 100° C. and the electrolyte was also heated to 100° C. The cavity is placed between two heated platens as discussed in FIG. 2. The electrolyte was injected into the cavity through the hole in the tab using a heated syringe at a rate of 0.25 cc/min. After cooling the gap in the main seal was sealed as in example 1 using a UV curable adhesive. The tab was scribed and removed by breaking along the scribed line. The residual gap in the main seal formed by tab removal was sealed by UV adhesive in the same manner. The electrolyte upon cooling formed a solid due to formation of crystals. A residual sample of the electrolyte showed that the melting temperature of the solid electrolyte was 75° C. (peak temperature) when analyzed in the differential scanning calorimeter.

When 1.2V was applied (reflective electrode was negative), the device reflectivity changed from 85% to 8.7% at 550 nm. 80% of this change occurred in 3 seconds. When the two electrodes were shorted the device bleached from 8.7% to 85% reflectivity at 550 nm. 80% of this change occurred in 7.4 seconds.

The invention clamied is:

1. A method of producing a cell for an electrochromic device comprising front and rear spaced elements, each having front and rear surfaces and a seal member bonding said front and rear elements together in a spaced apart relationship to define a chamber with at least one vent and one inlet that is at least partially formed in a detachable tab, wherein the method comprises injecting an electrolyte composition in liquid state into the chamber via the inlet and then closing the inlet and the vent.

2. A method of producing a cell for an electrochromic device comprising front and rear spaced elements, each having front and rear surfaces and a seal member bonding said front and rear elements together in a spaced apart relationship to define a chamber, wherein the method comprises injecting a liquid electrolyte in the chamber via a detachable tab, wherein a sealant is applied to at least one of the front and rear surfaces in a manner that forms a vent and a fluid inlet at the detachable tab, and injecting liquid electrolyte into the chamber via the fluid inlet at the detachable tab.

3. A method as set forth in claim 2, wherein the vent is at least partially formed in the sealant.

4. A method as set forth in claim 3, including closing the vent when the chamber is filled with the liquid electrolyte.

5. A method as set forth in claim 3, including detaching the tab to form a gap in the sealant, and then closing the gap in the sealant.

6. A method as set forth in claim 5, wherein the injected electrolyte comprises an electrolyte that solidifies in the chamber by formation of multiphase structure.

7. A method as set forth in claim 5, wherein the injected electrolyte comprises an electrolyte that solidifies in the chamber by formation of cross links.

8. An electrochromic mirror device comprising front and rear spaced elements, each having front and rear surfaces and a seal member bonding said front and rear elements together in a spaced apart relationship to define a chamber with at least one vent and one inlet, wherein the said chamber is filled by injecting an electrolyte composition in liquid state via an inlet in a detachable tab.

9. An electrochromic mirror device as in claim 8 wherein the electrolyte is solidified after the chamber is filled.

10. An electrochromic mirror device as in claim 9 where the solidification occurs via any one of multpiphase formation or polymerization.

11. An electrochromic mirror device as in claim 8 wherein the electrolyte is injected at an elevated temperature.

12. An electrochromic mirror device as in claim 8, wherein the said chamber is preheated prior to the filling process.

13. An electrochromic mirror device as in claim 8, wherein the electrolyte composition is injected at a pressure between 5 and 50 psi.

14. An electrochromic mirror device as in claim 8, wherein the chamber is clamped during the injection process.

15. A method of producing a cell for an electrochromic mirror device comprising front and rear spaced elements, each having front and rear surfaces and a seal member bonding said front and rear elements together in a spaced apart relationship to define a chamber wherein the method comprises injecting an electrolyte in the liquid state into the chamber via an inlet in a detachable tab and wherein the said injection process further comprises of sealing the nozzle of the injection device against the said inlet during the said injection process.

16. A method of producing a cell for an electrochromic mirror device as in claim 15 wherein the chamber is flushed with an inert gas prior to the electrolyte injection process.

* * * * *